US008693491B2

(12) United States Patent
Yamagishi

(10) Patent No.: US 8,693,491 B2
(45) Date of Patent: Apr. 8, 2014

(54) PACKET TRANSMISSION DEVICE, SIGNAL TERMINATING DEVICE, COMMUNICATION SYSTEM, AND COMMUNICATION METHOD

(75) Inventor: Yuichi Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 261 days.

(21) Appl. No.: 13/253,001

(22) Filed: Oct. 4, 2011

(65) Prior Publication Data
US 2012/0087305 A1 Apr. 12, 2012

(30) Foreign Application Priority Data

Oct. 7, 2010 (JP) ................................. 2010-227585

(51) Int. Cl.
H04L 12/54 (2013.01)
H04L 12/70 (2013.01)
H04J 3/17 (2006.01)
H04L 12/66 (2006.01)
H04B 1/38 (2006.01)
G06F 3/033 (2013.01)

(52) U.S. Cl.
USPC ........... 370/429; 370/392; 370/433; 370/463; 370/912; 455/73; 455/130

(58) Field of Classification Search
USPC ......... 370/229, 230, 231, 235, 236, 351, 389, 370/392, 431, 433, 901, 902, 912
See application file for complete search history.

(56) References Cited

U.S. PATENT DOCUMENTS

2010/0165881 A1* 7/2010 Hof et al. ....................... 370/254
2011/0134932 A1* 6/2011 Gooch et al. .................. 370/409

FOREIGN PATENT DOCUMENTS

JP 2002-354037 A 12/2002
JP 2003-124987 A 4/2003

* cited by examiner

Primary Examiner — Omar Ghowrwal
(74) Attorney, Agent, or Firm — Fujitsu Patent Center

(57) ABSTRACT

A packet transmission device includes a receiver which receives an encapsulated packet obtained by adding a header to a packet which includes a user signal; a memory which stores an address of a transmission source of the user signal stored in the encapsulated packet with respect to an identifier that identifies a type of the user signal included in the header; a processor which controls a band, through which the encapsulated packet passes, based on a value obtained by multiplying a number of addresses of the transmission source stored in the memory with respect to the identifier by a guarantee band allocated for the identifier; and a transmitter which transmits the encapsulated packet to a first network based on the control by the processor.

9 Claims, 19 Drawing Sheets

FIG. 3

| FIELD NAME | EXPLANATION |
|---|---|
| TERMINAL SERVICE IDENTIFIER | SHOW TYPE OF TERMINAL |
| GUARANTEE BAND | SHOW GUARANTEE FOR ONE TERMINAL |
| GROUP IDENTIFIER | SHOW IDENTIFICATION INFORMATION OF EACH SERVICE GROUP |
| SERVICE DESTINATION IDENTIFIER | SHOW DESTINATION ADDRESS OF ENCAPSULATED DATA |

FIG. 4A

| TERMINAL SERVICE IDENTIFIER | 1 (LTE) |
|---|---|
| GUARANTEE BAND | 50Mbps |
| GROUP IDENTIFIER | 00-FF-68-5D-00-01 |
| SERVICE DESTINATION IDENTIFIER | 00-FF-68-5D-10-00 |

FIG. 4B

| TERMINAL SERVICE IDENTIFIER | 2 (Zigbee) |
|---|---|
| GUARANTEE BAND | 250Kbps |
| GROUP IDENTIFIER | 00-FF-68-5D-00-02 |
| SERVICE DESTINATION IDENTIFIER | 00-FF-68-5D-10-00 |

FIG. 5A

| FIELD NAME | SIZE | EXPLANATION |
|---|---|---|
| DA | 6 | STORE SERVICE DESTINATION IDENTIFIER |
| SA | 6 | STORE GROUP IDENTIFIER |
| TPID | 2 | ARBITRARY FIXED VALUE |
| S-VID | 2 | ARBITRARY FIXED VALUE |

FIG. 5B

| FIELD NAME | SIZE | EXPLANATION |
|---|---|---|
| B-DA | 6 | STORE SERVICE DESTINATION IDENTIFIER |
| B-SA | 6 | STORE GROUP IDENTIFIER |
| TPID | 2 | ARBITRARY FIXED VALUE |
| B-VID | 2 | ARBITRARY FIXED VALUE |
| TPID | 2 | ARBITRARY FIXED VALUE |
| I-SID | 4 | ARBITRARY FIXED VALUE |

FIG. 8

| FIELD NAME | EXPLANATION |
|---|---|
| GROUP IDENTIFIER | GROUP IDENTIFIER OF EACH SERVICE GROUP |
| QUEUE IDENTIFIER | IDENTIFIER OF QUEUE THAT STORES PACKET OF EACH SERVICE GROUP |
| SA OF IP PACKET [1] | SA OF IP PACKET STORED IN ENCAPSULATED DATA |
| FLAG [1] | FLAG INDICATING RECEPTION HISTORY IN AGING PERIOD |
| SA OF IP PACKET [2] | FLAG INDICATING RECEPTION HISTORY IN AGING PERIOD |
| FLAG [2] | FLAG INDICATING RECEPTION HISTORY IN AGING PERIOD |
| ⋮ | ⋮ |
| ⋮ | ⋮ |
| SA OF IP HEADER [n] | FLAG INDICATING RECEPTION HISTORY IN AGING PERIOD |
| FLAG [n] | FLAG INDICATING RECEPTION HISTORY IN AGING PERIOD |

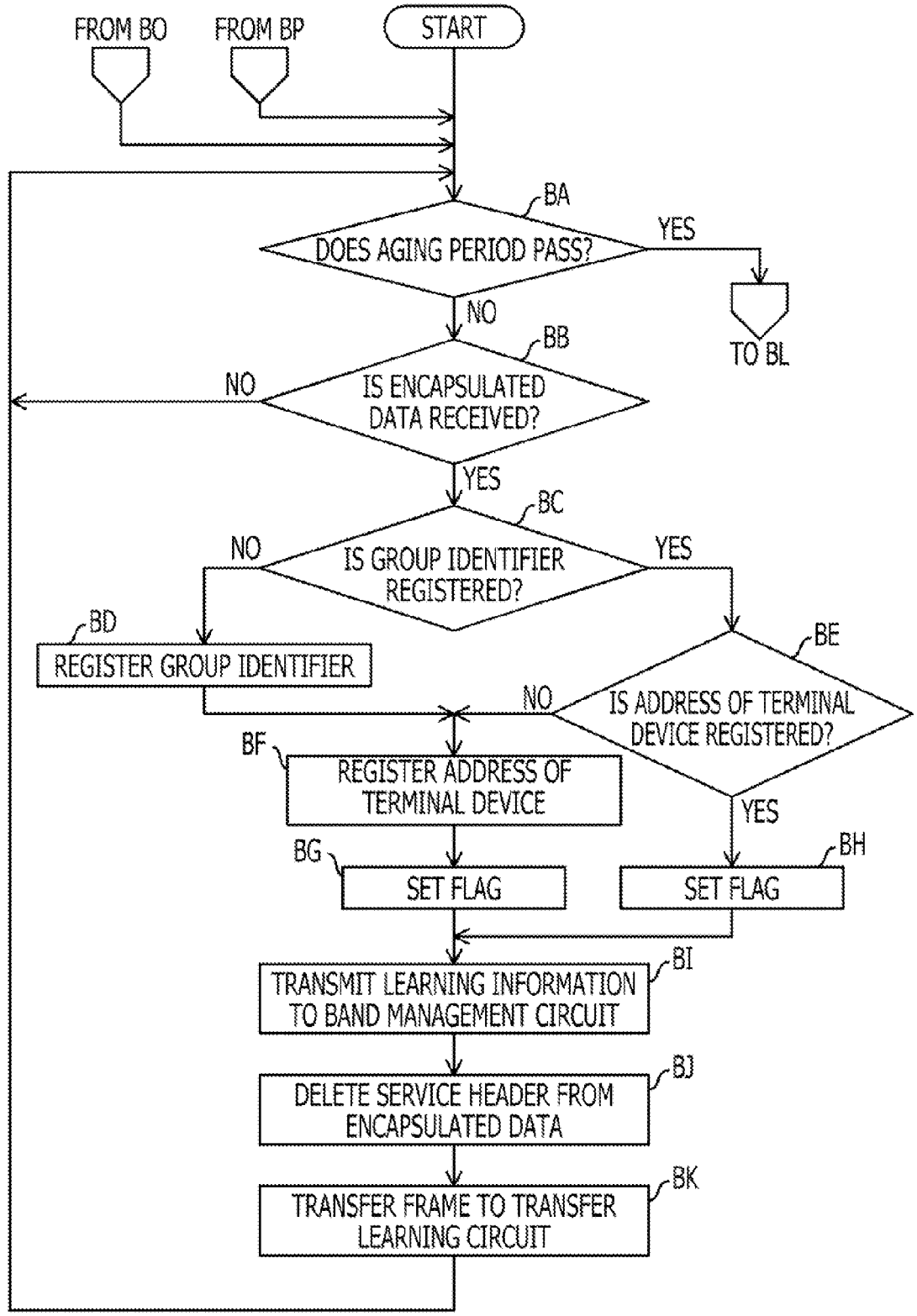

FIG. 12A

| GROUP IDENTIFIER | QUEUE IDENTIFIER | SA OF IP PACKET | FLAG |
|---|---|---|---|
| ~ | ~ | ~ | ~ |
| ⋮ | ⋮ | ⋮ | ⋮ |
| ⋮ | ⋮ | ⋮ | ⋮ |
| ~ | ~ | ~ | ~ |
| ~ | ~ | ~ | ~ |
| ⋮ | ⋮ | ⋮ | ⋮ |

FIG. 12B

| GROUP IDENTIFIER | QUEUE IDENTIFIER | SA OF IP PACKET | FLAG |
|---|---|---|---|
| 00-FF-68-5D-00-01 | 1 | 123.234.34.1 | ON |
| ⋮ | ⋮ | ⋮ | ⋮ |
| ⋮ | ⋮ | ⋮ | ⋮ |
| ~ | ~ | ~ | ~ |
| ~ | ~ | ~ | ~ |
| ⋮ | ⋮ | ⋮ | ⋮ |

FIG. 12C

| GROUP IDENTIFIER | QUEUE IDENTIFIER | SA OF IP PACKET | FLAG |
|---|---|---|---|
| 00-FF-68-5D-00-01 | 1 | 123.234.34.1 | ON |
| ⋮ | ⋮ | ⋮ | ⋮ |
| ⋮ | ⋮ | ⋮ | ⋮ |
| 00-FF-68-5D-00-01 | 1 | 123.234.34.1 | ON |
| ~ | ~ | ~ | ~ |
| ⋮ | ⋮ | ⋮ | ⋮ |

FIG. 12D

| GROUP IDENTIFIER | QUEUE IDENTIFIER | SA OF IP PACKET | FLAG |
|---|---|---|---|
| 00-FF-68-5D-00-01 | 1 | 123.234.34.1 | ON |
| ⋮ | ⋮ | ⋮ | ⋮ |
| ⋮ | ⋮ | ⋮ | ⋮ |
| 00-FF-68-5D-00-01 | 1 | 123.234.34.20 | ON |
| 00-FF-68-5D-00-02 | 2 | 234.34.56.1 | ON |
| ⋮ | ⋮ | ⋮ | ⋮ |

FIG. 12E

| GROUP IDENTIFIER | QUEUE IDENTIFIER | SA OF IP PACKET | FLAG |
|---|---|---|---|
| 00-FF-68-5D-00-01 | 1 | 123.234.34.1 | ON |
| ⋮ | ⋮ | ⋮ | ⋮ |
| ⋮ | ⋮ | ⋮ | ⋮ |
| 00-FF-68-5D-00-01 | 1 | 123.234.34.20 | ON |
| 00-FF-68-5D-00-02 | 2 | 234.34.56.1 | OFF |
| ⋮ | ⋮ | ⋮ | ⋮ |

FIG. 12F

| GROUP IDENTIFIER | QUEUE IDENTIFIER | SA OF IP PACKET | FLAG |
|---|---|---|---|
| 00-FF-68-5D-00-01 | 1 | 123.234.34.1 | ON |
| ⋮ | ⋮ | ⋮ | ⋮ |
| ⋮ | ⋮ | ⋮ | ⋮ |
| 00-FF-68-5D-00-01 | 1 | 123.234.34.20 | ON |
| - | - | - | - |
| ⋮ | ⋮ | ⋮ | ⋮ |

FIG. 13

| FIELD NAME | EXPLANATION |
|---|---|
| TERMINAL SERVICE IDENTIFIER | SHOW TYPE OF TERMINAL DEVICE |
| GUARANTEE BAND | SHOW GUARANTEE BAND FOR ONE TERMINAL |
| PRIORITY | SHOW PRIORITY ALLOCATED TO EACH SERVICE GROUP |
| GROUP IDENTIFIER | SHOW IDENTIFICATION INFORMATION OF EACH SERVICE GROUP |
| SERVICE DESTINATION IDENTIFIER | SHOW DESTINATION ADDRESS OF ENCAPSULATED DATA |

FIG. 14

| FIELD NAME | EXPLANATION |
|---|---|
| TERMINAL SERVICE IDENTIFIER | SHOW TYPE OF TERMINAL DEVICE |
| GUARANTEE BAND | SHOW GUARANTEE BAND FOR ONE TERMINAL |
| GROUP IDENTIFIER | SHOW IDENTIFICATION INFORMATION OF EACH SERVICE GROUP |
| SERVICE DESTINATION IDENTIFIER | SHOW DESTINATION ADDRESS OF ENCAPSULATED DATA |
| MINIMUM GUARANTEE TERMINAL NUMBER | SHOW NUMBER OF TERMINALS OF WHICH BAND IS GUARANTEED IN EACH SERVICE GROUP |

FIG. 15

| FIELD NAME | EXPLANATION |
|---|---|
| TERMINAL SERVICE IDENTIFIER | SHOW TYPE OF TERMINAL DEVICE |
| GUARANTEE BAND | SHOW GUARANTEE BAND FOR ONE TERMINAL |
| GROUP IDENTIFIER | SHOW IDENTIFICATION INFORMATION OF EACH SERVICE GROUP |
| SERVICE DESTINATION IDENTIFIER | SHOW DESTINATION ADDRESS OF ENCAPSULATED DATA |
| INCREASE STEP WIDTH | SHOW INCREASE STEP WIDTH PER INCREASE OF BAND |
| DECREASE STEP WIDTH | SHOW DECREASE STEP WIDTH PER DECREASE OF BAND |

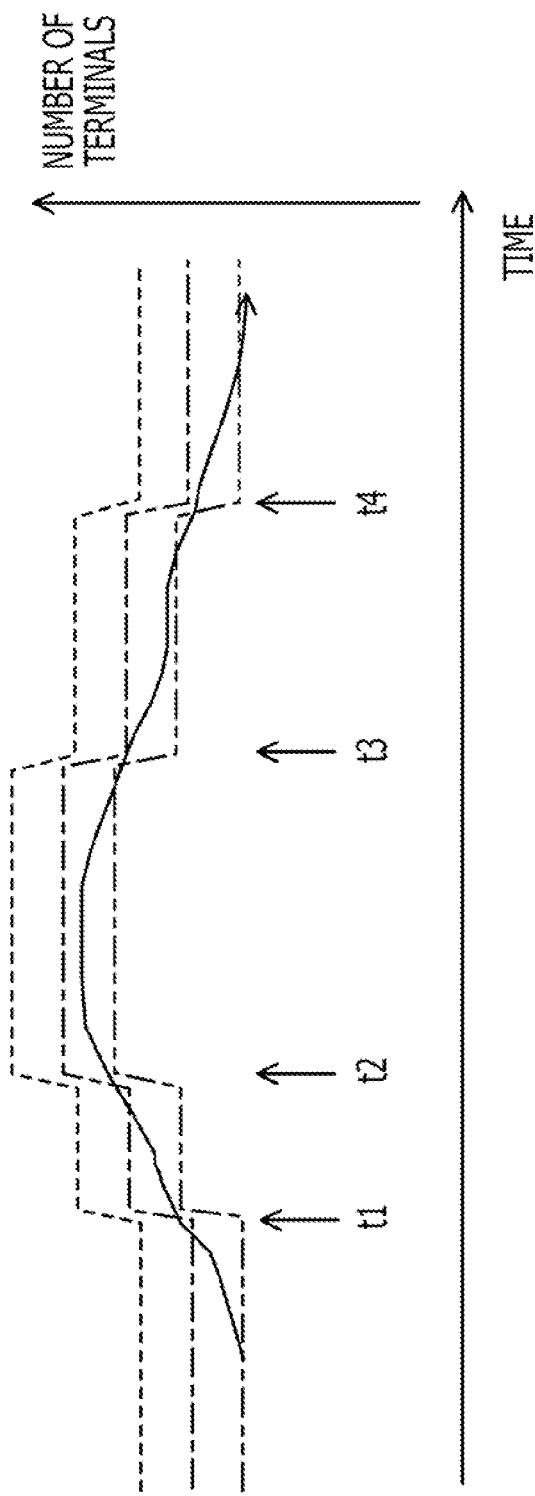

US 8,693,491 B2

PACKET TRANSMISSION DEVICE, SIGNAL TERMINATING DEVICE, COMMUNICATION SYSTEM, AND COMMUNICATION METHOD

CROSS-REFERENCE TO RELATED APPLICATIONS

This application is based upon and claims the benefit of priority from the prior Japanese Patent Application No. 2010-227585 filed on Oct. 7, 2010, the entire contents of which are incorporated herein by reference.

FIELD

The embodiments discussed herein are related to a packet transmission device, a signal terminating device, a communication system, and a communication method.

BACKGROUND

There is a proposal and use of a communication system that transmits a signal transmitted from a mobile node to a network through a signal terminating device and a packet transmission device. The above-described communication system is used to transmit an uplink signal, which is transmitted from, for example, a radio terminal device to a network.

There is a disclosed control method of a node for using a band that is proportional to the ratio of the access speed of each terminal. According to this method, a queue is provided for each access speed of each terminal in the node on the communication network in which a plurality of terminals are integrated by different speeds. Management is performed to determine whether the terminal is active or inactive for each IP address based on header information of an input packet. If an arrival data amount from the terminal in a certain period of time has increased, the terminal is determined to be active. The number of active terminals for each access speed is calculated, band allocation for each queue is determined by using the calculated number of active terminals.

There is a proposal of a method for guaranteeing a service quality that is specified for each quality class even if the traffic amount is increased. According to this method, every time the number of users increases or decreases, calculation of a desired band for each quality class is performed to calculate a desired band ratio. By using the desired band ratio, a composite sequence table in which composite of an ATM adaptation layer 2 (AAL-2) short cell with an ATM (Asynchronous Transfer Mode) cell is performed, and an ATM cell transmission order table in which the ATM cell is transmitted are generated. According to the composite sequence table, the composite of the AAL-2 short cell with the ATM cell is performed. The ATM cell is transmitted to a VP line according to the ATM cell transmission sequence table. For example, Japanese Laid-open Patent Publication No. 2003-124987 and Japanese Laid-open Patent Publication No. 2002-354037 may be considered related art of the present invention.

SUMMARY

According to an aspect of the invention, a packet transmission device includes a receiver which receives an encapsulated packet obtained by adding a header to a packet which includes a user signal; a memory which stores an address of a transmission source of the user signal stored in the encapsulated packet with respect to an identifier that identifies a type of the user signal included in the header; a processor which controls a band, through which the encapsulated packet passes, based on a value obtained by multiplying a number of addresses of the transmission source stored in the memory with respect to the identifier by a guarantee band allocated for the identifier; and a transmitter which transmits the encapsulated packet to a first network based on the control by the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an explanatory diagram of a configuration example of a first service attribute table;

FIGS. 4A and 4B are diagrams illustrating a first example and a second example of the first service attribute table;

FIGS. 5A and 5B are diagrams illustrating an example of a service header;

FIG. 8 is a diagram illustrating an example of a service header learning table;

FIGS. 9A and 9B are diagrams illustrating an example of processing of a service header learning circuit;

FIGS. 12A to 12F are diagrams illustrating examples of changes of the service header learning table;

FIG. 13 is a diagram illustrating a second example of a second service attribute table;

FIG. 14 is a diagram illustrating a third example of the second service attribute table;

FIG. 15 is a diagram illustrating a fourth example of the second service attribute table;

FIG. 16 is a diagram illustrating an example of band control by using the second service attribute illustrated in FIG. 17.

DESCRIPTION OF EMBODIMENTS

A band in which traffic transmitted from a mobile node flows into a network from a packet transmission device, and may be controlled by allocating an allowable band in advance. However, there are various attributes of the traffic that flows into the network from the mobile node.

For example, there is a mobile node that maintains coupling. On the other hand, there is another type of mobile node that frequently repeats coupling and disrupting. There is a mobile node that has a low priority and low urgency even though a high data speed is desired. On the other hand, there is another type of mobile node that has a high priority and high urgency even though a low data speed is used. There is a mobile node that has a low burst property. On the other hand, there is a mobile node that has a high burst property even though a low data speed is used. The above-described mobile node is a radio terminal device, for example.

Therefore, the band control by an allowable band allocated in advance has the following problem. When each mobile node is unlikely regularly coupled to the network, the band to be secured for traffic flow into the network may not be controlled in real time in response to increase and decrease of the number of the coupled terminals.

To provide a band guaranteed service with respect to the traffic of the mobile node, a larger band is desired to be allocated regardless of the actual traffic amount. This may cause waste of the network resource usage.

To provide a best effort type service with respect to the traffic of the mobile node, simply an empty band secured by the band guarantee type service may be used. This may cause delay or lack of the packet.

Figure 1:
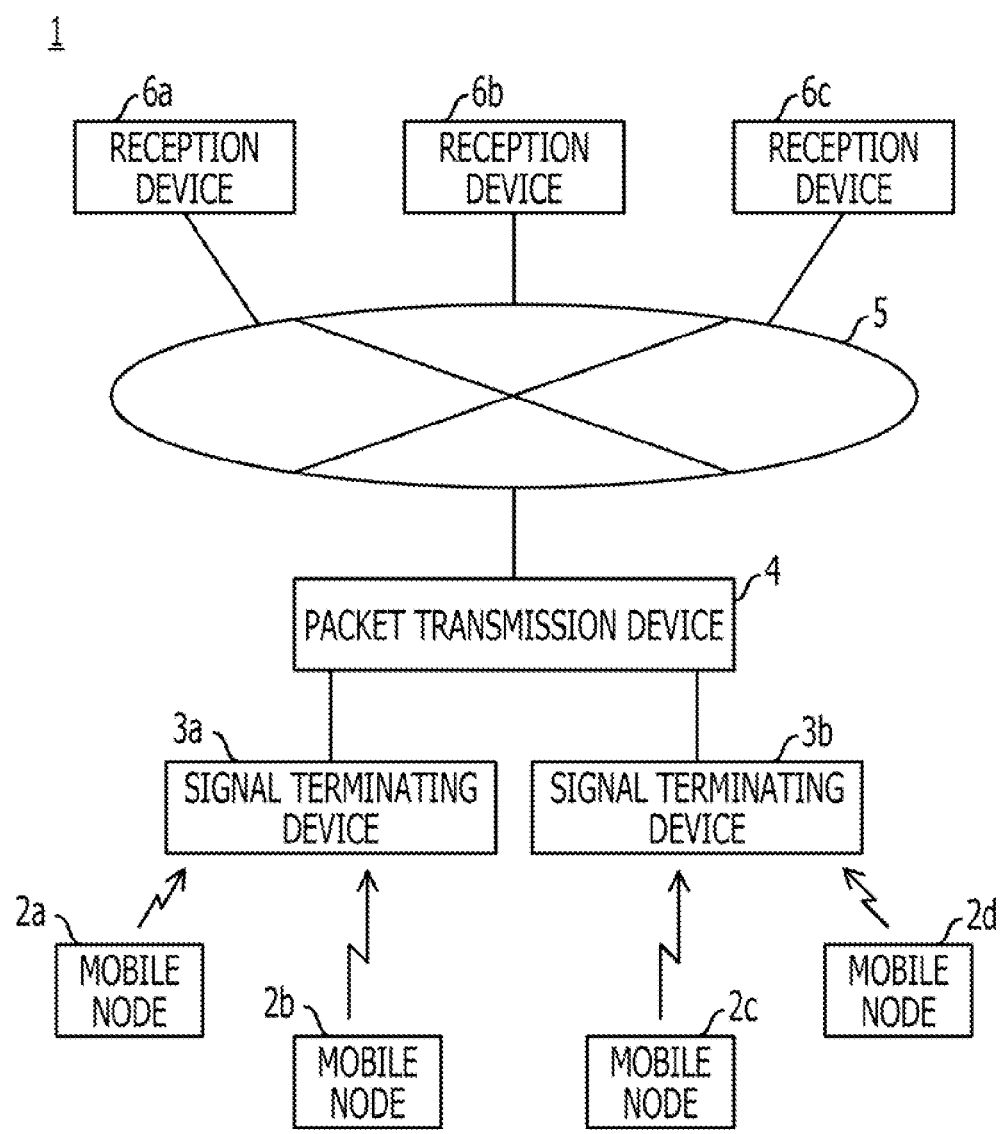
FIG. 1 is a diagram illustrating an example of a communication network.

With reference to the attached diagrams, embodiments of the present invention will be described. FIG. 1 is a diagram illustrating an example of a communication network. A communication network 1 includes mobile nodes 2a to 2d, signal terminating devices 3a and 3b, a packet transmission device 4, a first network 5, and reception devices 6a to 6c. Hereinafter, the mobile nodes 2a to 2d are collectively referred to as "mobile node 2." The signal terminating devices 3a and 3d are collectively referred to as "signal terminating device 3." The reception devices 6a to 6c are collectively referred to as "reception device 6."

The mobile node 2 transmits a signal to the signal terminating device 3. The above-described mobile node is a radio terminal device that transmits an uplink signal to the signal terminating device 3 through a radio communication line, for example. The mobile node 2 as the radio communication terminal device will be described below. However, the following description does not intend that the mobile node 2 is limited to the radio communication terminal device in the embodiments disclosed in the present specification. The signal terminating device 3 generates a packet by packetizing the uplink signal received from the mobile node 2. The signal terminating device 3 transmits the generated packet to the packet transmission device 4.

The packet transmission device 4 receives the packet transmitted from the signal terminating device 3. The packet transmission device 4 routes the received packet to transfer the packet to the reception device 6 as a specified destination through the first network. The reception device 6 receives the packet transmitted through the first network 5.

For example, the mobile node 2, the signal terminating device 3, and the packet transmission device 4 may be a part of the system that is compliant with Long Term Evolution (LTE). The radio signal of the uplink transmitted from the mobile node 2 is received by an Evolved UTRAN NodeB (eNB) as the signal terminating device 3.

The base station generates a packet from the received uplink signal and transmits the packet to a System Architecture Evolution Gateway (SAE-GW) as the packet transmission device 4. The SAE-GW transmits the received packet to the network. In this case, the reception device 6 may be, for example, an application server that receives the uplink signal from the mobile node 2.

The mobile node 2, the signal terminating device 3, and the packet transmission device 4 may be a communication system that employs Zigbee, for example. For example, the radio signal of the uplink transmitted from the mobile node 2 as a Zigbee terminal is received by a sensor gateway as the signal terminating device 3. The sensor gateway generates a packet from the received uplink signal and transmits the packet to the gateway as the packet transmission device 4. The gateway transmits the received packet to the network 5.

Figure 2:
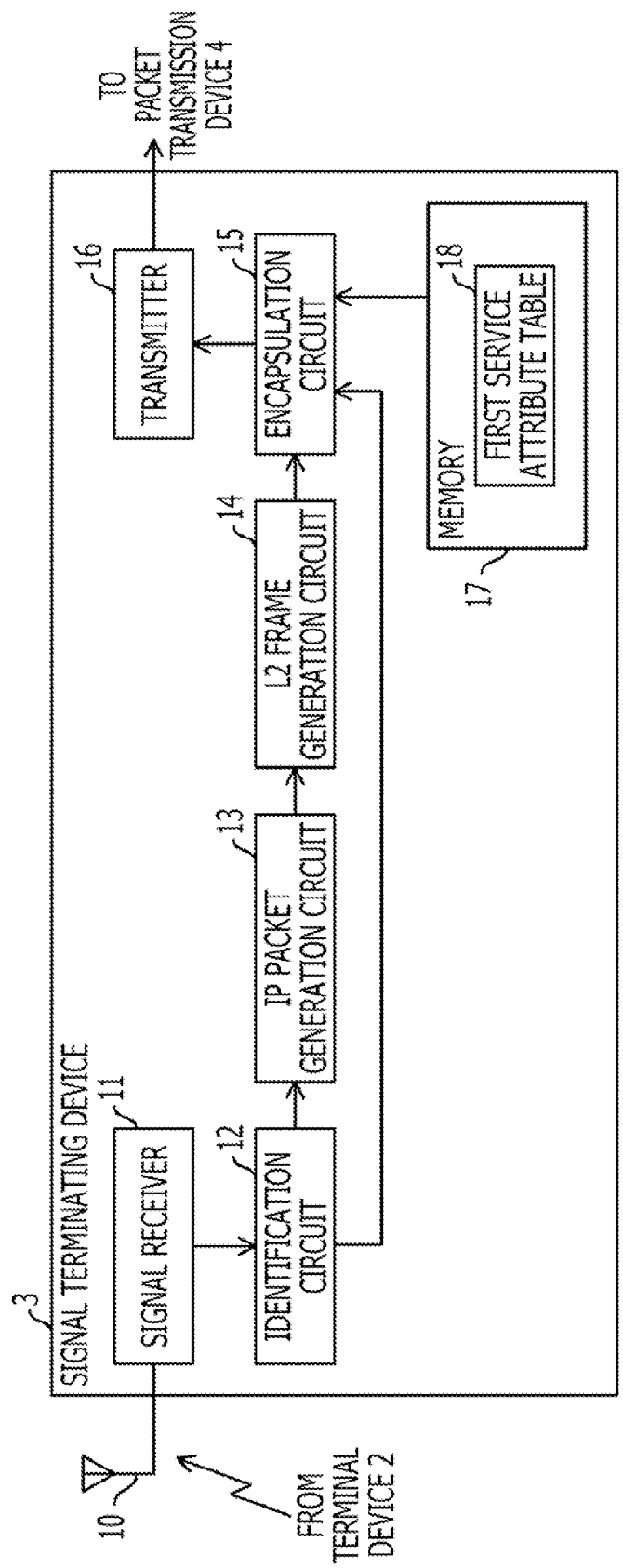
FIG. 2 is a diagram illustrating a first example of a signal terminating device.

A configuration and processing of the signal terminating device 3 illustrated in FIG. 1 will be described. FIG. 2 is a diagram illustrating a first example of the signal terminating device 3. The signal terminating device 3 includes an antenna 10, a signal receiver 11, an identification circuit 12, an internet protocol packet generation circuit 13, a layer 2 frame generation circuit 14, an encapsulation circuit 15, a transmitter 16, and a memory 17. Hereinafter, in the description and diagrams, "internet protocol" and "layer 2" are referred to as "IP" and "L2," respectively.

The signal receiver 11 receives the uplink signal transmitted from the mobile node 2 through the antenna 10. The identification circuit 12 identifies a type of the uplink signal. The type of the uplink signal identified by the identification circuit 12 may be a service type, for example. Here, the "service type" is a type of communication standard by which the mobile node 2 transmits the uplink signal. For example, the service type may be "LTE," "HSPA," "Zigbee," or the like that distinguishes the communication method. A type obtained by combining sortation by the guarantee band, which guarantees each terminal, and the sortation by the communication method may be used as a service type.

The IP packet generation circuit 13 packetizes the received uplink signal into an IP packet. The L2 frame generation circuit 14 stores the packet, which is generated by the IP packet generation circuit 13, in the L2 frame.

The encapsulation circuit 15 generates an encapsulated packet by adding the header described below to the L2 frame generated by the L2 frame generation circuit 14. In the following description, the header added to the L2 frame by the encapsulation circuit 15 is indicated as a "service header."

The transmitter 16 transmits the encapsulated packet to the packet transmission device 4. The memory 17 stores a first service attribute table 18. The first service attribute table 18 stores information related to a type of the uplink signal to be identified by the identification circuit 12.

FIG. 3 is a diagram illustrating an example of the first service attribute table 18. The first service attribute table 18 illustrated in FIG. 3 stores the information related to the service type. The example in which the type of the uplink signal identified by the identification circuit 12 is the service type will be described below.

The first service attribute table 18 includes a terminal service identification field, a guarantee band field, a group identifier field, and a service destination identifier field. The terminal service identifier field stores information indicating the type of the mobile node 2 by which the signal terminating device 3 receives the uplink signal. For example, the value of the terminal service identifier field may be an identifier that identifies a communication method used by the mobile node 2.

The guarantee band field stores information indicating a band guaranteed for the traffic of the uplink signal for one terminal on each service type. The group identifier field stores identification information of the service group of each service type. In this case, the "service group" refers to a group of the mobile node 2 that transmits the uplink signal according to the similar service type. Hereinafter, the identification information stored in the group identifier field is referred to as a "group identifier."

The service destination identifier field may store an address of the packet transmission device 4 of the destination to which the encapsulated packet is transmitted. Hereinafter, the address to be stored in the service destination identifier field is referred to as a "service destination identifier."

FIGS. 4A and 4B illustrate the first example and the second example of the first service attribute table 18. Regarding the entry illustrated in FIG. 4A, the terminal service identifier field stores an identifier "1" indicating the LTE. Similarly, the guarantee band field, the group identifier field, and the service destination identifier field store a band "50 Mbps," a group identifier "00-FF-68-5D-00-01," and a service destination identifier "00-FF-68-5D-10-00," respectively.

Regarding the entry illustrated in FIG. 4B, the terminal service identifier field stores an identifier "2" indicating Zigbee. Similarly, the guarantee band field, the group identifier field, and the service destination identifier field store a band "250 Kbps," a group identifier "00-FF-68-5D-00-02," and a service destination identifier "00-FF-68-5D-10-00," respectively.

According to the service type identified by the identification circuit 12, the encapsulation circuit 15 illustrated in FIG. 2 generates the service header that is to be added to the L2 frame that stores the signal transmitted from each mobile node 2 based on the information stored in the first service attribute table 18.

For example, the encapsulation circuit 15 retrieves the record, which stores the identifier of the communication method of the service type identified by the identification circuit 12 and the guarantee band, in the first service attribute table 18. The encapsulation circuit 15 stores the group identifier, which is stored in the group identifier field of the detected record, in the service header.

For example, the service header may be compliant with the header format of the frame or packet transmitted in a specified communication protocol. By employing the above-described header format, between the signal terminating device 3 and the packet transmission device 4, the encapsulated packet may be transmitted through the network of the specified communication protocol.

That is, between the signal terminating device 3 and the packet transmission device 4, the communication network 1 may include the second network in which the encapsulated packet is transmitted according to the specific communication protocol. In this case, the encapsulation circuit 15 may store the service destination identifier, which is stored in the service destination identifier field of the record detected by the above-described retrieval, as the destination address of the packet transmission device 4 in the second network, in the service header.

An example of the service header that is compliant with the header format of the frame or packet transmitted in the specified communication protocol will be described. FIGS. 5A and 5B illustrate an example of the service header. The header format illustrated in FIG. 5A is a format of a MAC header that is compliant with IEEE 802.1ad. The MAC header includes a DA field, an SA field, a TPID field, and an S-VID field. The encapsulation circuit 15 may store the service destination identifier as the destination address in the DA field.

The encapsulation circuit 15 may store the group identifier in the SA field provided for a transmission source address. The encapsulation circuit 15 may store an arbitrary value in the TPID field and the S-VID field, respectively.

The header format illustrated in FIG. 5B is a MAC header format that is compliant with IEEE 802.1ah. The MAC header includes a B-DA field, a B-SA field, a TPID field, a B-VID field, and an I-SID. The encapsulation circuit 15 may store the service destination identifier as the destination address in the B-DA field. The encapsulation circuit 15 may store the group identifier in the B-SA field prepared for the transmission source address. The encapsulation circuit 15 may store an arbitrary value in the TPID field, the B-VID field, and the I-SID field, respectively.

Figure 6:
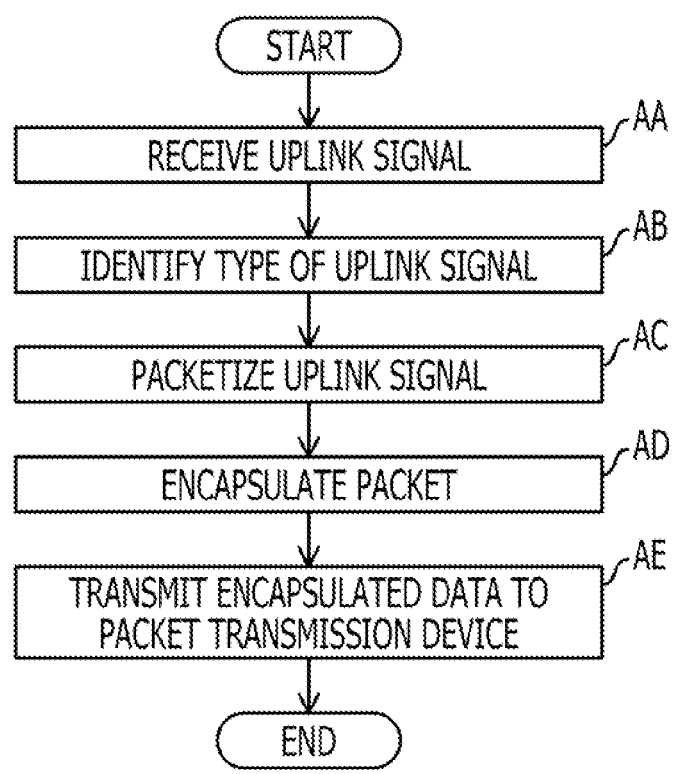
FIG. 6 is an example of processing of a signal terminating device illustrated in FIG. 2.

Processing of the signal terminating device 3 illustrated in FIG. 2 will be described. FIG. 6 is a diagram illustrating an example of the processing of the signal terminating device 3. In other embodiments, each of Operation AA to AE may be a step.

In Operation AA, the signal receiver 11 receives the uplink signal transmitted from the mobile node 2. In Operation AB, the identification circuit 12 identifies the type of the uplink signal. In Operation AC, the IP packet generation circuit 13 generates a packet signal from the uplink signal. The L2 frame generation circuit 14 stores the packet, which is generated by the IP packet generation circuit 13, in the L2 frame.

In Operation AD, the encapsulation circuit 15 encapsulates the L2 frame by adding the service header according to the type of the uplink signal to the L2 frame generated by the L2 frame generation circuit 14. In Operation AE, the transmitter 16 transmits the encapsulated packet to the packet transmission device 4.

Figure 7:
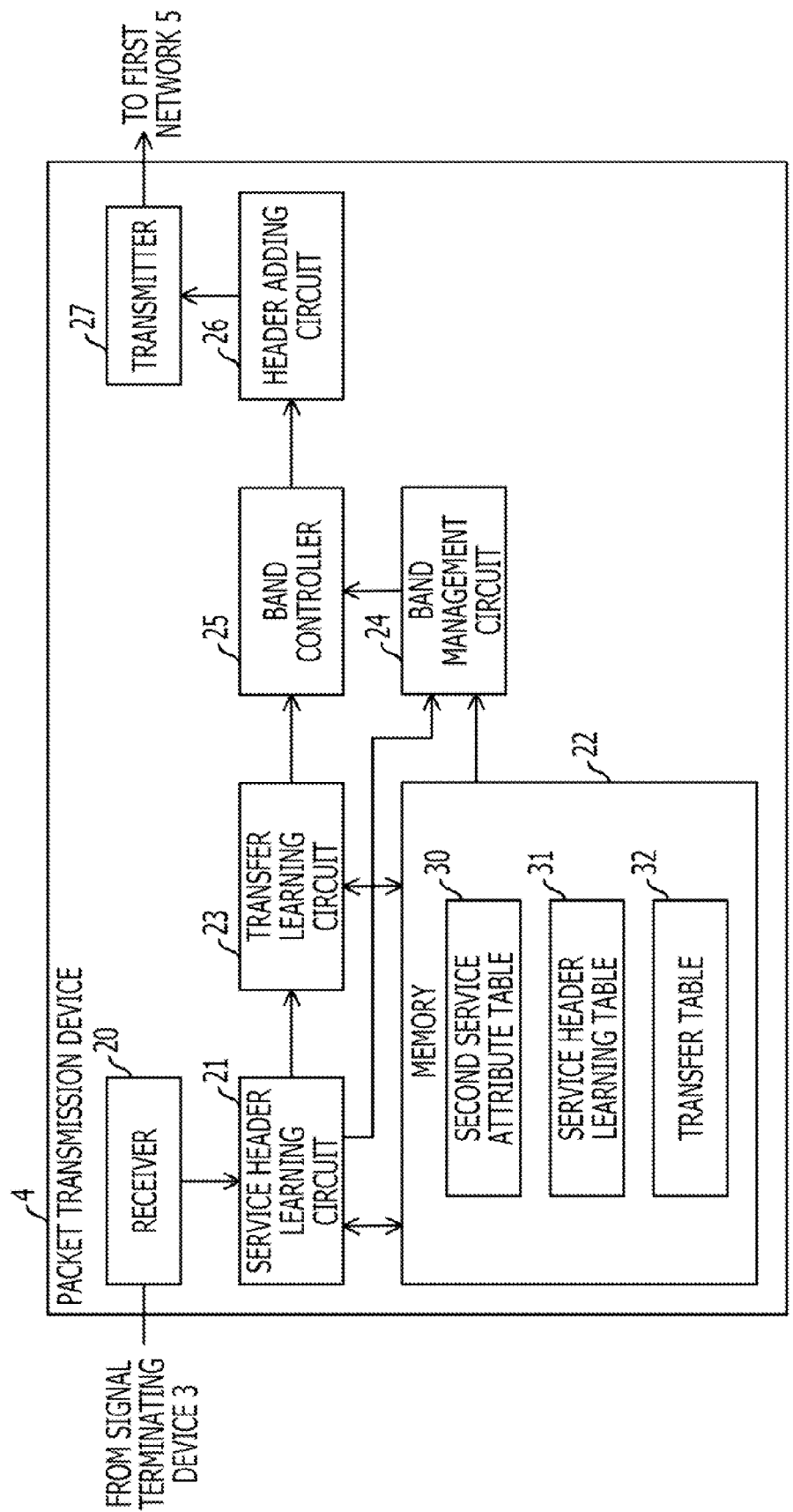
FIG. 7 is a diagram illustrating an example of a packet transmission device.

The configuration and processing of the packet transmission device 4 illustrated in FIG. 1 will be described. FIG. 7 is a diagram illustrating an example of the packet transmission device 4. The packet transmission device 4 includes a receiver 20, a service header learning circuit 21, a memory 22, a transfer learning circuit 23, a band management circuit 24, a band controller 25, a header adding circuit 26, and a transmitter 27. The memory 22 stores a second service attribute table 30, a service header learning table, and a transfer table 32.

The receiver 20 receives the encapsulated packet transmitted from the signal terminating device 3. By referring to the IP packet included in the received encapsulated packet, the service header learning circuit 21 identifies the mobile node 2 that transmits the uplink signal to be stored in the encapsulated packet.

By referring to the group identifier to be stored in the service header of the encapsulated packet, the service header learning circuit 21 identifies the service group to which the mobile node 2 of the transmission source of the uplink signal belongs, that is, the service type.

The service header learning circuit 21 sorts the mobile node 2 of the transmission source of the uplink signal according to each group identifier and stores the mobile node 2 in a service header learning table 31. If the service header learning circuit 21 does not receive the uplink in a given period from the mobile node 2 stored in the service header learning table 31, the service header learning circuit 21 deletes the mobile node 2 from the service header learning table 31. Here, the given period means a prescribed aging period, for example.

FIG. 8 is an explanatory diagram of a configuration example of the service header learning table 31. The service header learning table 31 has a group identifier field, a queue identifier field, Source Address (SA) fields [1] to [n] of IP packet, and flag fields [1] to [n].

The group identifier field stores the group identifier of the encapsulated packet received from the packet transmission device 4. The queue identifier field stores the identifier of the queue, which specifies the packet queue inside the band controller 25, and is used to store the packet of the service group of each group identifier. The band controller 25 is, for example, a processor such as a network processing unit (NPU) or a central processing unit (CPU).

For example, a prescribed queue may be allocated in advance to the packet queue that stores a packet of each service group. The packet queue used to store the packet of each service group may be specified according to the priority determined depending on the value of the VID specified by the MAC header of the L2 frame stored in each encapsulated packet. The packet queue used to store the packet of each service group may be specified according to the priority specified for each group identifier as described below.

The SA field of the IP packet stores the IP address of the mobile node 2 of the transmission source of the uplink signal, which is sorted by each group identifier. The flag field stores flag information indicating whether or not the uplink is received from each mobile node 2 in the given period.

The service header learning circuit 21 stores information in the SA field and the flag field of the IP packet for each mobile node 2. Therefore, the service header learning table 31 has the SA field and the flag field of a plurality of IP packets for each identifier. As illustrated in FIG. 8, the service header learning table 31 has the SA field and the flag field of n IP packets for each group identifier.

With reference to FIG. 7, embodiments will be described. The service header learning circuit 21 transmits learning information related to the mobile node 2 stored in the service header learning table 31 for each group identifier. The learning information may include the number of the mobile nodes 2 registered in the service header learning table 31 for each group identifier. The learning information may include information related to a packet queue specified for each group identifier.

The service header learning circuit 21 removes the service header from the encapsulated packet and outputs the L2 frame stored in the encapsulated packet to the transfer learning circuit 23.

Figure 9B:
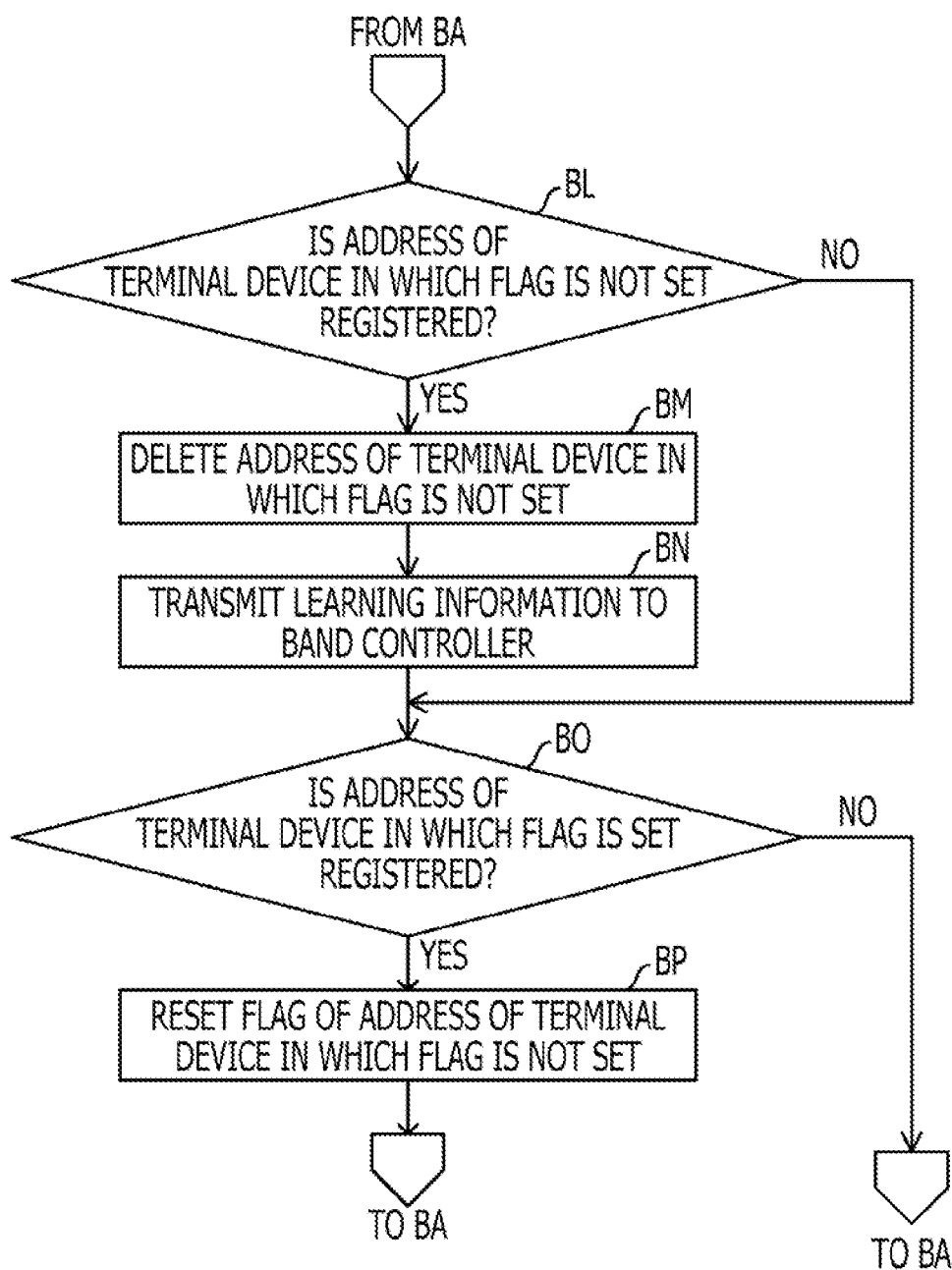

With reference to FIGS. 9A and 9B, learning processing of the mobile node 2 by the service header learning circuit 21 will be described. In other embodiments, each of the following operations BA to BP may be a step.

As illustrated in FIG. 9, in Operation BA, the service header learning circuit 21 determines whether or not the given period passes. If the given period passes (YES in Operation BA), the process goes to Operation BL. If the given period does not pass (NO in Operation BA), the process goes to Operation BB.

In Operation BB, the service header learning circuit 21 determines whether or not the encapsulated packet is received. If the encapsulated packet is received (YES in Operation BB), the process goes to Operation BC. If the encapsulated packet is not received (NO in Operation BB), the process goes to Operation BA.

In Operation BC, the service header learning circuit 21 detects the group identifier to be stored in the service header of the received encapsulated packet. The service header learning circuit 21 determines whether or not the detected group identifier is already registered in the service header learning table 31. If the group identifier is registered (YES in Operation BC), the process goes to Operation BE. If the group identifier is not registered (NO in Operation BC), the process goes to Operation BD.

In Operation BD, the service header learning circuit 21 registers the group identifier of the received encapsulated packet in the service header learning table 31. The process goes to Operation BF.

In Operation BE, the service header learning circuit 21 determines whether or not the transmission source address of the IP packet stored in the service header of the received encapsulated packet, that is, whether or not the IP address of the mobile node 2 is registered in the service header learning table 31.

If the IP address of the mobile node 2 is registered (YES in Operation BE), the process goes to Operation BH. The IP address of the mobile node 2 is not registered (NO in Operation BE), the process goes to Operation BF.

In Operation BF, the service header learning circuit 21 registers, in the service header learning table 31, the IP address of the mobile node 2 of the transmission source of the uplink signal stored in the received encapsulated packet.

In Operation BG, regarding the IP address registered in Operation BF, the service header learning circuit 21 sets the value of the flag stored in the service header learning table 31 to "ON." The process goes to Operation BI.

In Operation BH, regarding the transmission source address of the IP packet stored in the service header of the received encapsulated packet, the service header learning circuit 21 sets the value of the flag stored in the service header learning table 31 to "ON." The process goes to Operation BI.

In Operation BI, the service header learning circuit 21 transmits the learning information to the band management circuit 24. In Operation BJ, the service header learning circuit 21 deletes the service header from the encapsulated packet. In Operation BK, the service header learning circuit 21 outputs the L2 frame to the transfer learning circuit 23. The process goes to Operation BA.

As illustrated in FIG. 9B, in Operation BL, the service header learning circuit 21 determines whether or not the address of the mobile node of which the flag to be stored in the flag field is set to "ON" is registered in the service header learning table 31. If the address of the mobile node of which the flag is not set to "ON" is registered (YES in Operation BL), the process goes to Operation BM. If the address of the mobile node of which the flag is not set to "ON" is not registered (NO in Operation BL), the process goes to Operation BO.

In Operation BM, the service header learning circuit 21 deletes the registration of the address of the mobile node, of which the flag to be stored in the flag field is not set to "ON," from the service header learning table 31. In Operation BN, the service header learning circuit 21 transmits the learning information to the band management circuit 24.

In Operation BO, the service header learning circuit 21 determines whether or not the address, of which the flag to be stored in the flag field is set to "ON," is registered in the service header learning table 31. If the address of the mobile node of which the flag is set to "ON" is registered (YES in Operation BO), the process goes to Operation BP. If the address of the mobile node of which the flag is set to "ON" is not registered (NO in Operation BO), the process goes to Operation BA.

In Operation BP, regarding the address of the mobile node of which the flag to be stored in the flag field is set to "ON," the service header learning circuit 21 resets the value of the flag stored in the service header learning table 31 to "OFF." The process goes to Operation BA.

With reference to FIG. 7, embodiments will be described. The transfer learning circuit 23 stores the transmission source address of the MAC header of the L2 frame in the transfer table 32. The transfer learning circuit 23 transfers the L2 frame to the band controller 25.

The band management circuit 24 receives the learning information from the service header learning circuit 21. The band management circuit 24 obtains the value of the guarantee band guaranteed for one terminal in each service group, and the value is stored in the second service attribute table 30. The configuration of the second service attribute table 30 may be equivalent to the configuration of the first service attribute table 18 illustrated in FIG. 3.

Based on the learning information and the value of the guarantee band guaranteed for one terminal in each service group, the band management circuit 24 calculates the band to be allocated to each service group. For example, regarding a certain service group, if the guarantee band guaranteed for one terminal is B and if the number of the terminals registered in the service header learning table 31 is N, the band management circuit 24 may calculate the band to be allocated to the service group by the following formula (1).

$$\text{(Band allocated to service group)} = N \times B \quad (1)$$

The band management circuit 24 outputs, to the band controller 25, the band calculated for each service group and the information for specifying the packet queue that allocates the band.

Figure 10:
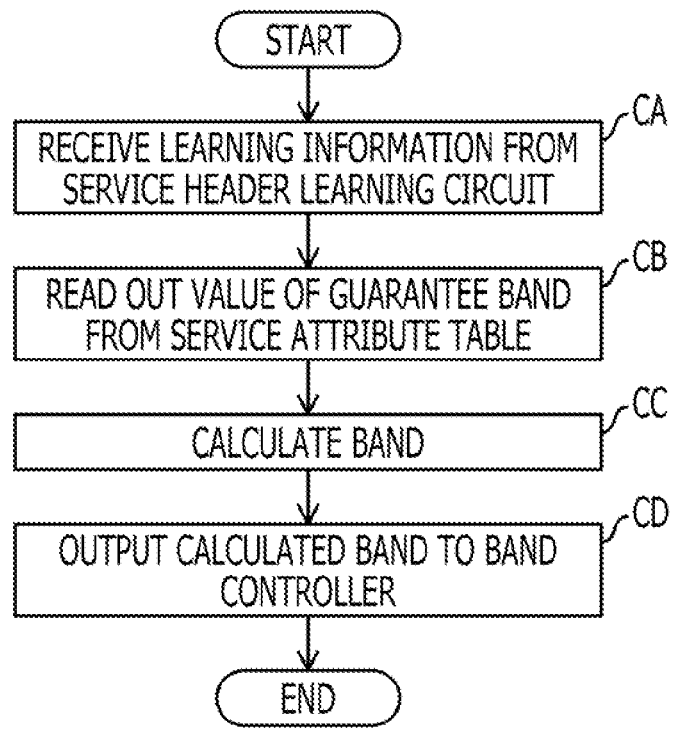
FIG. 10 is a diagram illustrating an example of processing of a band management circuit.

With reference to FIG. 10, the process of the above-described band management circuit 24 will be described. In other embodiments, each operation of the following Operations CA to CD may be a step. In Operation CA, the band management circuit 24 receives the learning information from the service header learning circuit 21. In Operation CB, the band management circuit 24 obtains, from the second service attribute table 30, the value of the guarantee band guaranteed for one terminal in each group In Operation CC, based on the learning information and the value of the guarantee band guaranteed for one terminal in each service group, the band management circuit 24 calculates the band to be allocated to each service group. In Operation CD, the band management circuit 24 outputs the band calculated for each service group and information that specifies the packet queue that allocates the band.

Figure 11:
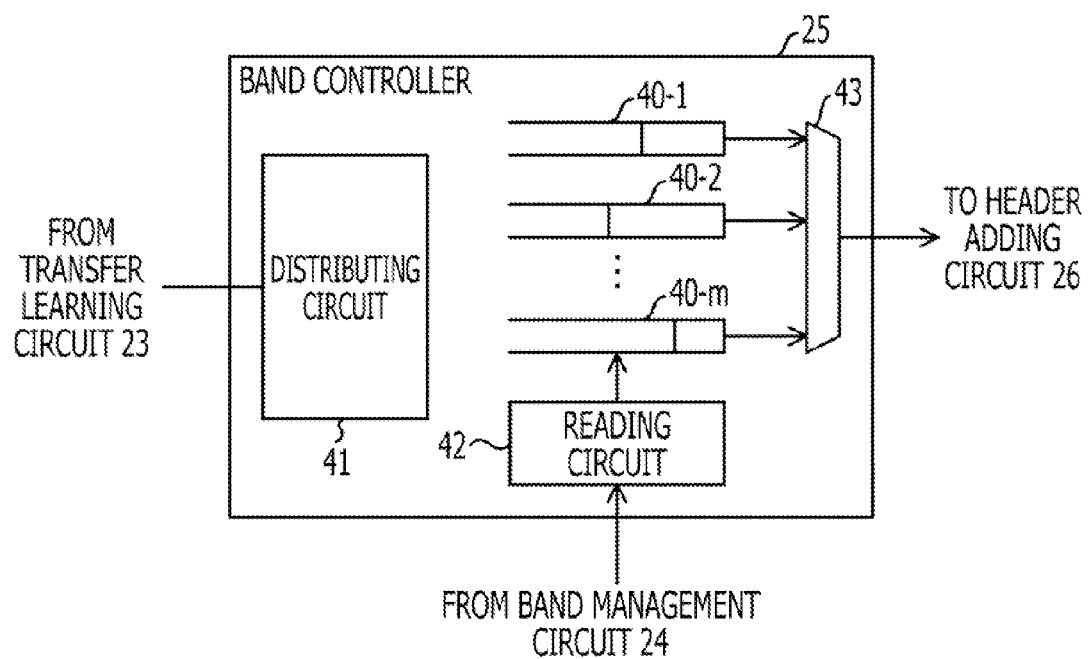
FIG. 11 is a diagram illustrating an example of a band controller.

The band controller 25 controls the allowable band through which the L2 frame of each service group transferred from the transfer learning circuit 23 passes so that the allowable band is equal to or lower than the band specified by the band management circuit 24. FIG. 11 is a diagram illustrating an example of the band controller 25.

The band controller 25 includes a plurality of packet queues 40-1 to 40-m, a distributing circuit 41, a reading circuit 42, and a multiplexing circuit 43. Hereinafter, the packet queues 40-1 to 40-m are collectively referred to as "packet queue 40."

The packet queue 40 stores the L2 frame transferred from the transfer learning circuit 23. The distributing circuit 41 distributes the L2 frame, which is transferred from the transfer learning circuit 23, to the packet queue 40 specified for each service group.

The reading circuit 42 receives the band calculated for each service group and the information for specifying the packet queue 40 to be allocated to each service group. The reading circuit 42 reads out the L2 frame in the band specified by each packet queue. The multiplexing circuit 43 multiplexes the read L2 frame and outputs the multiplexed L2 frame to the header adding circuit 26.

With reference to FIG. 7, embodiments will be described. The header adding circuit 26 adds a prescribed header to be used to transmit the first network 5 to the L2 frame output from the band controller 25. The transmitter 27 outputs the frame added with the header to the first network 5.

A change of the service header learning table 31 made when the encapsulated packet is received and the band control by the band controller 25 according to the change will be described. FIGS. 12A to 12F are diagrams illustrating an example of change of the service header learning table 31. The following description is made based on the conditions (1) to (4).

(1) The packet transmission device 4 receives the encapsulated packet of the service group of the identifiers "00-FF-68-5D-00-01" and "00-FF-68-5D-00-02" illustrated in FIGS. 4A and 4B. The guarantee bands are illustrated in FIGS. 4A and 4B.

(2) The band controller 25 stores the packet of the service group of the identifier "00-FF-68-5D-00-01" in the packet queue of the identifier "1" from among the packet queues 40. The band controller 25 stores the packet of the service group of the identifier "00-FF-68-5D-00-02" in the packet queue of the identifier "2."

(3) Regarding the band controller 25, the upper limit of the total physical band that may be allocated to the groups is 1000 Mbps, and the reading priority of the packet queue of the identifier "2" is set to be higher than the reading priority of the packet queue of the identifier "1."

(4) The minimum unit of the band allocated by the band controller 25 is 1 Mbps.

FIG. 12A illustrates a service header learning table 31 in an initial state. Since the packet transmission device 4 does not receive the encapsulated packet, the service header learning table 31 does not register the IP address of the mobile node 2.

The packet transmission device 4 receives the encapsulated packet. The encapsulated packet stores the uplink signal of the mobile node 2 that belongs to the service group of the group identifier "00-FF-68-5D-00-01." The mobile node 2 has an IP address "123.234.34.1." In this case, the service header learning table 31 is in the state illustrated in FIG. 12B.

As illustrated in FIG. 12B, the record, in which "00-FF-68-5D-00-01," "1," and "123.234.34.1" are stored in the group identifier field, the queue identifier field, and the SA field of the IP packet respectively, is formed in the service header learning table 31. The value of the flag field is set to "ON."

The guarantee band for one terminal in the service group of the group identifier "00-FF-68-5D-00-01" is 50 Mbps. The number of the mobile nodes 2 of the service group to be registered in the service header learning table 31 is 1. Therefore, 50 Mbps×one terminal=50 Mbps is allocated as the pass band of the packet queue of the identifier "1."

The encapsulated packet reaches the packet transmission device 4. The packet transmission device 4 receives the encapsulated packet that stores the uplink signal of the $20^{th}$ mobile node 2 belonging to the service group of the group identifier "00-FF-68-5D-00-01." In this case, the service header learning table 31 is in the state illustrated in FIG. 12C. In the example, the $20^{th}$ mobile node 2 has an IP address "123.234.34.20."

As a result, the record, in which "00-FF-68-5D-00-01," "1," and "123.234.34.20" are stored in the group identifier field, the queue identifier field, and the SA field of the IP packet respectively, is added to the service header learning table 31. The value of the flag filed is set to "ON."

The number of the mobile nodes 2 of the service group to be registered in the service header learning table 31 is 20. Therefore, 50 Mbps×20 terminals=1000 Mbps as the pass band of the packet queue of the identifier "1" is allocated.

The packet transmission device 4 receives another encapsulated packet. The encapsulated packet stores the uplink signal of the mobile node 2 that belongs to the service group of the group identifier "00-FF-68-5D-00-02." The mobile node 2 has an IP address "234.34.56.1." In this case, the service header learning table 31 is in the state illustrated in FIG. 12D.

As a result, the record, in which "00-FF-68-5D-00-02," "2," and "234.34.56.1" are stored in the group identifier field, the queue identifier field, and the SA field of the IP packet, is added to the service header learning table 31. The value of the flag field is set to "ON."

The guarantee band for one terminal in the service group of the group identifier "00-FF-68-5D-00-02" is 250 Kbps. The number of the registrations in the service group in the service header learning table 31 is 1. Therefore, the band management circuit 24 calculates a band to be allocated to the service group according to 250 Kbps×one terminal=250 Kbps. The band controller 25 allocates the pass band of 1 Mbps as the minimum unit to the packet queue of the identifier "2."

The band controller 25 reduces the pass band of the packet queue of the identifier "1" so that the allocated band of the packet queues "1" and "2" of which the limit of the physical band does not exceed 1000 Mbps. For example, the band controller 25 reduces the guarantee band 50 Mbps for one terminal from the band 1000 Mbps currently allocated, so that the band 950 Mbps is reallocated to the packet queue of the identifier "1."

After that, the coupling between the mobile node 2 of the address "234.34.56.1" and the network is disrupted. Therefore, the transmission of the uplink signal from the mobile node 2 is not performed in the given period, so that the service header learning table 31 is in the state illustrated in FIG. 12E. The value of the flag stored with respect to the mobile node 2 of the address "234.34.56.1" is reset to "OFF."

As a result, the service header learning circuit 21 deletes the registration of the mobile node 2 of the address "234.34.56.1" from the service header learning table 31. The service header learning table 31 is in the state illustrated in FIG. 12F.

The band controller 25 sets the pass band to be allocated to the packet queue of the identifier "2" to 0. As a result, 950 Mbps, the total of the allocated bands of the packet queues "1" and "2," is lower than 1000 Mbps, the upper limit of the physical band. The band controller 25 puts back the value of the band of the packet queue of the identifier "1" to the value 1000 Mbps calculated by the band management circuit 24.

According to the present embodiment, the total of the guarantee band to be allocated to the coupled mobile node may be calculated depending on the multiplication of the number of the mobile nodes of the transmission source, which are sorted for each type of the uplink signal transmitted from the mobile node, and the guarantee band allocated for each type. Therefore, the band, in which the signal is transmitted from the packet transmission device into the network, may be dynamically controlled according to a coupling state of the coupled mobile node.

The band, in which the signal is transmitted from the packet transmission device into the network, may be dynamically controlled. Thus, an allocated band amount may be adjusted according to the coupling state when the band guarantee type service is provided. As a result, according to the present embodiment, the usage efficiency of the network resource may be increased.

According to the present embodiment, the usage of the band guarantee type service is promoted if the usage efficiency of the network resource is increased when the band guarantee type service is provided. If the usage frequency of the band guarantee type service is increased, the usage frequency of the best effort type service is relatively decreased. As a result, the problem occurring when the above-described best effort type service is used is solved.

The signal terminating device 3 identifies the type of the uplink signal and capsules the packet of the uplink signal by the identifier. Due to this, by referring to the service header, the packet transmission device 4 may determine the type of the uplink signal. According to the present invention, type determination of the uplink signal in the packet transmission device 4 performing the band control processing is easy.

According to the present embodiment, as a format of the service header, the header format of the frame or packet transmitted by the specified communication protocol is used, and the identifier of the type of the uplink signal is stored in the transmission source address. As a result, by using an existing algorithm for learning the transmission source address of the frame or the packet by the specific communication protocol, the identifier of the type of the uplink signal stored in the service header may be learned. As a result, the embodiments become simple.

Other embodiments will be described. FIG. 13 is a diagram illustrating a second example of the second service attribute table 30. The second service attribute table 30 includes the field equivalent to the field included in the first service attribute table 18 illustrated in FIG. 3. The second service attribute table 30 further includes a priority field.

The priority field stores information related to the priority to be allocated to each service group. According to the priority of each service group stored in the priority field, the distributing circuit 41 of the band controller 25 illustrated in FIG. 11 distributes the L2 frame to the packet queue 40. According to the priority of each service group stored in the priority field, the service header learning circuit 21 specifies the value of the queue identifier field of the service header learning table 31.

FIG. 14 is a diagram illustrating a third example of the second service attribute table 30. The second service attribute table 30 includes the field equivalent to the field included in the first service attribute table 18 illustrated in FIG. 3. The second service attribute table 30 further includes a minimum guarantee terminal number field. Moreover, the second service attribute table 30 may include the priority field illustrated in FIG. 13.

The minimum guarantee terminal number field stores the minimum value of the number of the terminals to be guaranteed with the band by the band controller 25 in each service group. For example, if the minimum guarantee terminal number is M, the band management circuit 24 may calculate a band to be allocated to the service group by the following formula (2).

$$\text{(Band allocated to service group)}=(N+M)\times B$$

FIG. 15 is a diagram illustrating a fourth example of the second service attribute table 30. The second service attribute table 30 includes the field equivalent to the field included in the first service attribute table 18 illustrated in FIG. 3. The second service attribute table 30 further includes an increase step width field and a decrease step width field. Moreover, the second service attribute table 30 may include the priority field illustrated in FIG. 15 and the minimum guarantee terminal number field illustrated in FIG. 16.

The increase step width field stores the value indicating the increase step width per increase in which the band controller 25 increases the band according to the increase of the number of the terminals. The decrease step width field stores the value indicating the decrease step width per decrease in which the band controller 25 decreases the band according to the decrease of the number of the terminals. The width of the band that is specified by the increase step width and the decrease step width field may be greater than the guarantee band specified by the guarantee band field.

FIG. 16 is a diagram illustrating an example of band control using the second service attribute table 30 illustrated in FIG. 15. The solid line in FIG. 16 indicates a time change of a calculation value of the allocated band calculated by the band management circuit 24 according to the number of the mobile nodes. The dashed line indicates a time change of the band allocated by the band controller 25. The dot chain line indicates an upper threshold value to be compared to an output value by the band management circuit 24 when the band controller 25 determines whether or not the increase of the allocated band is desired. The two-dot chain line indicates the lower threshold value to be compared to the output value by the band management circuit 24 when the band controller 25 determines whether or not the decrease of the allocated band is desired.

In the time t1 and the time t2, if the calculation value of the allocated band exceeds the upper threshold value, the band controller 25 increases the allocated band by the band indicated in the increase step width field. At this time, the upper threshold value is increased by the band indicated in the increase step width field. In the time t3 and the time t4, if the calculation value of the allocated band is lower than the lower threshold value, the band controller 25 decreases the allocated band by the band indicated in the decrease step width field. At this time, the lower threshold value is decreased by the band indicated in the decrease step width field.

If the increase step width and the decrease step width are specified, the control frequency of the band controller 25 may be reduced. As a result, processing load of the band controller 25 is decreased.

Figure 17:
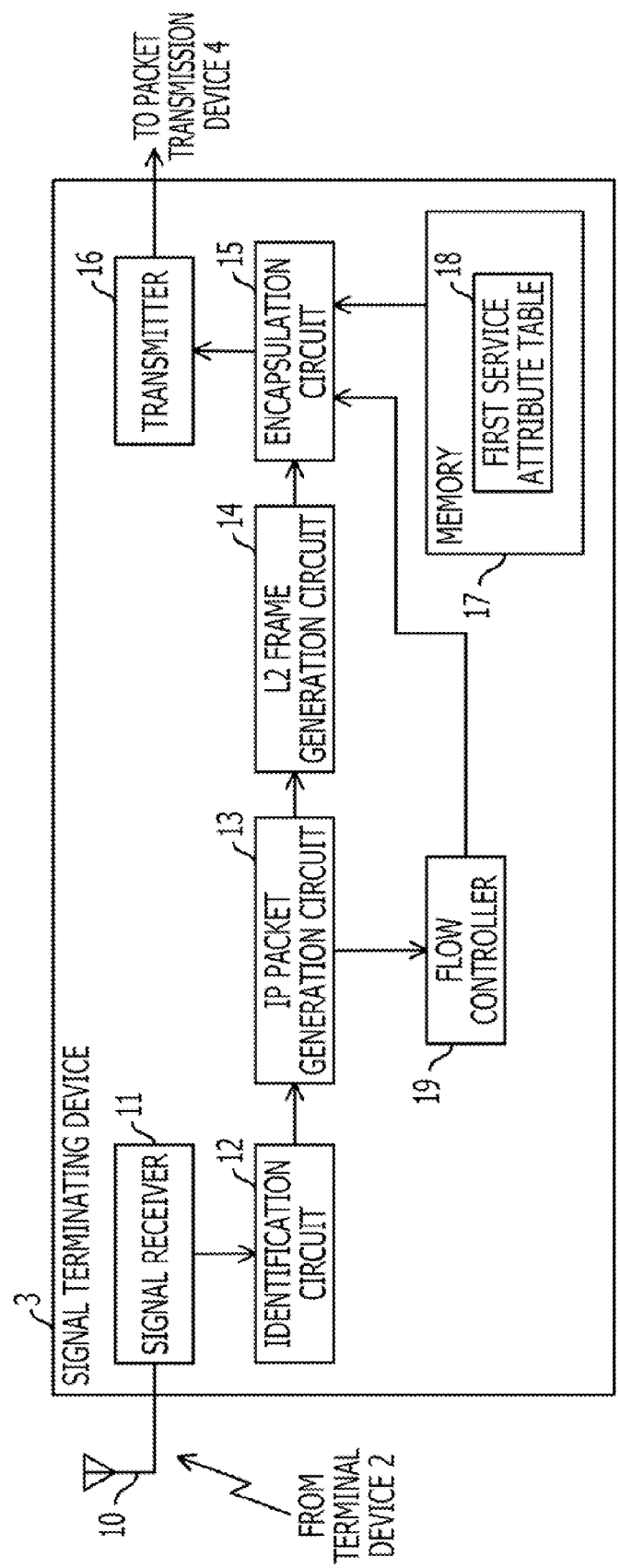
FIG. 17 is a diagram illustrating a second example of the signal terminating device.

Other embodiments of the signal terminal device 3 will be described. FIG. 17 is a diagram illustrating a second example of the signal terminating device 3. The elements equivalent to the component elements illustrated in FIG. 2 are indicated with the reference numerals equivalent to FIG. 2.

The number of the mobile nodes 2 of the transmission source of the user flow is determined for each type of the user flow transmitted from the mobile node 2 in addition to or instead of the service type. In the present embodiment, according to multiplication of a flow guarantee band guaranteed for each user flow and the number of the mobile nodes 2 for each user flow, the guarantee band that is allocated for each flow is controlled.

Therefore, the signal terminating device 3 includes a flow controller 19. The flow controller 19 identifies the type of the user flow transmitted from the mobile node 2. For example, the flow controller 19 may identify the type of the user flow by referring to call control data included in the uplink signal transmitted from the mobile node 2.

Based on the information stored in the first service attribute table 18 according to the type of the service flow identified by the flow controller 19, the encapsulation circuit 15 illustrated in FIG. 2 generates the service header to be added to the L2 frame that stores the signal transmitted from each mobile node 2. In the present embodiment, the terminal service identifier field of the first service attribute table 18 and the second service attribute table 30 stores the identifier that specifies the type of the service flow. The guarantee band field stores the information indicating the guarantee band that is guaranteed for each service flow.

According to the present embodiment, the band to be flew into the network from the packet transmission device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A packet transmission device, comprising:
 a receiver which receives an encapsulated packet obtained by adding a header to a packet which includes a user signal;
 a memory which stores an address of a transmission source of the user signal stored in the encapsulated packet with respect to an identifier that identifies a type of the user signal included in the header;
 a processor which controls a band, through which the encapsulated packet passes, based on a value obtained by multiplying a number of addresses of the transmission source stored in the memory with respect to the identifier by a value of a bandwidth of a guarantee band allocated for the identifier; and
 a transmitter which transmits the encapsulated packet to a first network based on the control by the processor.

2. The packet transmission device according to claim 1, further comprising:
 a learning circuit to store in a memory the address of the transmission source of the user signal stored in the encapsulated packet in the memory when the encapsulated packet is received, and to delete a piece of information of any of transmission sources from the memory when the encapsulated packet, which stores the user signal transmitted from any of the transmission sources is not received for a given period of time.

3. The packet transmission device according to claim 1, further comprising:
 a plurality of packet queues respectfully associated with a plurality of different identifiers from which the identifier is selected;
 a distributing circuit which distributes the encapsulated packet to one of the plurality of packet queues based on the identifier; and
 a reading circuit which reads out the packet from the packet queue at a reading speed according to a value obtained by multiplying the number of addresses of the transmission source stored with respect to the identifier by the value of the bandwidth of the guarantee band allocated for the identifier.

4. The packet transmission device according to claim 3, wherein
 the plurality of queues are allocated different priorities and the reading circuit reads out the encapsulated packet from one of the plurality of packet queues according to the priorities, and
 the distributing circuit distributes the packet to the plurality of packet queues according to the priority allocated depending on the identifier.

5. The transmission device according to claim 1, wherein the processor increases and decreases a value of a bandwidth of the band through which the encapsulated packet passes by a step width which is wider than a bandwidth of the band allocated depending on the identifier.

6. The packet transmission device according to claim 1, wherein
 the header is a MAC (Media Access Control) header, and a transmission source MAC address storage area of the MAC header stores the identifier.

7. The packet transmission device according to claim 1, wherein
 the header is a MAC header, and the receiver receives the encapsulated packet from a second network, and a destination MAC address storage area of the MAC header stores a MAC address of the packet transmission device in the second network.

8. A communication system comprising:
a signal terminating device; and
packet transmission device, wherein
the signal terminating device includes:
a first receiver which receives a user signal;
a packet generation circuit which generates a packet from the user signal;
an identification circuit which identifies a type of the user signal;
an encapsulation circuit which generates an encapsulated packet by adding a header including an identifier with respect to the type; and
an encapsulating packet transmitter which transmits the encapsulated packet to the packet transmission device, and
the packet transmitting device includes:
a second receiver which receives the encapsulated packet from the signal terminating device;
a memory which stores an address of a transmission source of the user signal stored in the encapsulated packet with respect to the identifier; and
a processor which controls a band, through which the encapsulated packet passes, based on a value obtained by multiplying a number of addresses of the transmission source stored in the memory with respect to the identifier by a value of a bandwidth of a guarantee band allocated for the identifier.

9. A communication method for transmitting a user signal to a first network through a signal terminating device and a packet transmission device, comprising:
generating a packet from a received user signal in the signal terminating device;
identifying a type of the user signal in the signal terminating device;
transmitting an encapsulated packet, which is obtained by adding a header with an identifier corresponding to the type to the packet, to the packet transmission device;
storing an address of a transmission source of the user signal to be stored in the encapsulated packet for the identifier in the packet transmission device;
controlling, with a processor, a band through which the packet stored in the encapsulated packet of the identifier passes, based on a value obtained by multiplying a number of addresses of the transmission source with respect to the identifier by a value of a bandwidth of a guarantee band allocated for the identifier in the packet transmission device, and
transmitting the packet to the first network based on the controlling.

* * * * *